(12) United States Patent
Welin et al.

(10) Patent No.: US 10,194,342 B2
(45) Date of Patent: Jan. 29, 2019

(54) COLLECTING CHARACTERISTICS FOR A PATH BETWEEN IP END-POINTS ASSOCIATED WITH A RADIO ACCESS TRANSPORT NETWORK

(71) Applicant: Telefonaktiebolaget LM Ericsson (publ), Stockholm (SE)

(72) Inventors: Annikki Welin, Solna (SE); Manuel Maqueda, Madrid (ES); Javier Montojo, Madrid (ES); Tomas Thyni, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 190 days.

(21) Appl. No.: 15/109,185

(22) PCT Filed: Feb. 27, 2014

(86) PCT No.: PCT/SE2014/050239
§ 371 (c)(1),
(2) Date: Jun. 30, 2016

(87) PCT Pub. No.: WO2015/130202
PCT Pub. Date: Sep. 3, 2015

(65) Prior Publication Data
US 2016/0330637 A1 Nov. 10, 2016

(51) Int. Cl.
*H04W 24/08* (2009.01)
*H04W 28/02* (2009.01)
(Continued)

(52) U.S. Cl.
CPC ....... *H04W 24/08* (2013.01); *H04W 28/0247* (2013.01); *H04W 80/04* (2013.01); *H04W 88/16* (2013.01)

(58) Field of Classification Search
CPC . H04W 24/08; H04W 28/0247; H04W 88/16; H04W 80/04
See application file for complete search history.

(56) References Cited

U.S. PATENT DOCUMENTS

2011/0044168 A1 2/2011 Nadas et al.
2011/0235528 A1 9/2011 Racz et al.
(Continued)

FOREIGN PATENT DOCUMENTS

WO   2006075951 A1   7/2006
WO   2008041929 A2   4/2008

OTHER PUBLICATIONS

Atlas, A. et al., "An Architecture for the Interface to the Routing System", draft-ietf-i2rs-architecture-02, Network Working Group Internet—Draft, Feb. 12, 2014, pp. 1-29, IETF.
(Continued)

*Primary Examiner* — Kwang B Yao
*Assistant Examiner* — Moo Jeong
(74) *Attorney, Agent, or Firm* — Coats & Bennett, PLLC (57) ABSTRACT

The present disclosure relates to a method performed in a radio base station in a radio access network, of collecting characteristics for a path between two IP end-point associated with a radio access transport network to which the radio base station is connected, the method comprising the steps of; receiving an IP address of at least one IP end-point associated with the radio access transport network to which the radio base station is connected; sending a query to a node, in the radio access transport network, for at least one characteristic for a path between two IP end-points. And receiving the at least one characteristics for the path.

30 Claims, 4 Drawing Sheets

(51) Int. Cl.
　　　*H04W 80/04*　　　　(2009.01)
　　　*H04W 88/16*　　　　(2009.01)

(56) References Cited

U.S. PATENT DOCUMENTS

| | | | | |
|---|---|---|---|---|
| 2013/0310098 A1* | 11/2013 | Baligh | ............... | H04L 5/0032 |
| | | | | 455/509 |
| 2014/0226481 A1* | 8/2014 | Dahod | ............ | H04W 36/0055 |
| | | | | 370/235 |
| 2015/0055621 A1* | 2/2015 | Koskinen | ............ | H04W 36/18 |
| | | | | 370/331 |
| 2015/0257024 A1* | 9/2015 | Baid | ................. | H04W 24/10 |
| | | | | 370/338 |

OTHER PUBLICATIONS

Zhang, L. et al., "Use Cases of I2RS in Mobile Backhaul Network", draft-zhang-i2rs-mbb-usecases-00, Network Working Group Internet—Draft, Oct. 21, 2013, pp. 1-10, IETF.

Atlas, A. et al., "An Architecture for the Interface to the Routing System", draft-ietf-i2rs-architecture-13, Network Working Group Internet—Draft, Feb. 20, 2016, pp. 1-34, IETF.

* cited by examiner

COLLECTING CHARACTERISTICS FOR A PATH BETWEEN IP END-POINTS ASSOCIATED WITH A RADIO ACCESS TRANSPORT NETWORK

TECHNICAL FIELD

The present disclosure relates to a method, performed in a radio base station in a radio access network, of collecting characteristics for a path between two IP end-points associated with a radio access transport network to which the radio base station is connected.

The disclosure also relates to a radio base station of collecting characteristics for a path between two IP end-points associated with a radio access transport network to which the radio base station is connected.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the, RAN, Radio Access Network of a UMTS and Evolved UTRAN, E-UTRAN, is the RAN of an LTE system.

In the future, new radio coordination features are planned for LTE. Examples of new radio coordination features are CoMP, Coordinated MultiPoint, ABS, Up-link and/or downlink Almost Blank Sub-frames, RPS, Reduced Power Sub-frames, eICIC, Enhanced Inter-Cell Interference Coordination. The different radio coordination features can be categorized in three different groups, namely; flexible, tight and very tight coordination features. The different radio coordination features all put different levels of requirements on the radio access transport network to be able to use these radio coordination features. As an example the delay required for different radio coordination functions varies between sub 1 millisecond to 100 milliseconds. Similar requirements are placed for synchronization and for bandwidth in the radio access transport network. The radio access transport network handles data traffic between the radio base stations and between the radio base stations and the core network.

Today's RAN's lack information on the radio access transport network characteristics, e.g. characteristics between RBS, Radio Base Station, neighbors as well as between RBS and S/PDN-GW, Serving Packet Data Network-Gateway, and the RNC, Radio Network Controller. It is problematic for the RAN to select the optimal radio coordination features when lacking knowledge of radio access transport network characteristics and synchronization accuracy. This results in sub optimal use of resources in the RAN as well as in the radio access transport network, and in the end non-optimal end-user performance.

Thus, the RBS, which decides what radio coordination features to use, has no or very little information of radio access transport network characteristics, e.g. if the synchronization method is accurate enough or if the delay and bandwidth between neighboring RBSs is sufficient to be used for a specific radio coordination feature. Active measurements like TWAMP/BART, Two-Way Active Measurement Protocol/Bandwidth Available in Real Time, does not have access to the real radio access transport network characteristics, instead it tries to estimate the radio access transport network characteristics based on injecting test traffic.

IETF, Internet Engineering Task Force, has released several drafts in the area of an application I2RS, Interface to Routing Systems, e.g. https://datatracker.ietf.org/wg/i2rs. The architecture of I2RS allows an application to query and modify the state of the transport network. The architecture describes requirements, and the draft "Use Cases of I2RS in Mobile Backhaul Network, https://datatracker.ietf.org/wg/i2rs, describes use cases for mobile backhaul and the radio access transport network.

Presently, the RBS, which decides what radio coordination features to use, has no or very little information of the radio access transport network conditions. There is therefore a need for an improved solution for determining radio coordination features, which solution solves or at least mitigates at least one of the above mentioned problems.

SUMMARY

It is an object of the present disclosure to provide embodiments solving the problem, in a radio base station, of deciding what radio coordination features to use, having no or limited information of the radio access transport network characteristics.

In particular, it is an object of the disclosure to provide embodiments establishing an interface between a radio base station and a node associated with a radio access transport network. Through this interface it is possible, according to an aspect of the present disclosure, to requests information from the radio access transport network and forward the information in suitable format to the radio base station to assist in the decision of radio coordination features, e.g. to determine if the radio access transport network characteristics meet the requirements of the radio coordination features.

A concept involves receiving at least one IP address of specific IP end-points associated with a radio access transport network to which a radio base station is connected and sending a query to a node in the radio access transport network for at least one characteristic for a path between two IP end-points.

The disclosure presents a method performed in a radio base station in a radio access network, of collecting characteristics for a path between two IP end-points associated with a radio access transport network to which the radio base station is connected. The method comprises the steps of receiving an IP address of at least one IP end-point associated with the radio access transport network to which the radio base station is connected, sending a query to a node in the radio access transport network for at least one characteristic for a path between the two IP end-points, and receiving the at least one characteristics for the path.

The disclosed method of collecting characteristics for a path between two IP end-points, provides for a method to requests information from the radio access transport network and receive the information in the radio base station to assist in the decision of radio coordination feature e.g. if the radio access transport network characteristics meets the radio coordination feature requirements.

In accordance with an aspect of the disclosed method, in the step of sending a query, the IP end-points are a first radio base station and a second radio base station.

Enabling reception of characteristics for a path between a first radio base station and a second radio base station, provides the advantage that the radio base station, either represented by the first or the second radio base station, better can determine if and what radio coordination feature to use since the characteristics for the path between the first and the second radio base station is important for the function of many radio coordination features.

In accordance with an aspect of the disclosed method, in the step of sending a, the radio base station and a PDN-Gateway or a S/PDN-Gateway in the core network to which the radio access network is connected are the IP end-points.

Enabling reception of characteristics for a path between the radio base station and a PDN-Gateway or a S/PDN-Gateway in the core network, provides the advantage that the radio base station better can determine if and what radio coordination feature to use since the characteristics for the path the radio base station and a PDN-Gateway or a S/PDN-Gateway in the core network is important for the function of many radio coordination features.

In accordance with an aspect of the disclosed method, in the step of sending a query a second radio base station and a PDN-Gateway or an S/PDN-Gateway in a core network to which the radio access network is connected are IP end-points.

Receipt of characteristics for a path a second radio base station and a PDN-Gateway or a S/PDN-Gateway in a core network, provides the advantage that the radio base station better can determine if and what radio coordination feature to use since the characteristics for the path between a second radio base station and a PDN-Gateway or a S/PDN-Gateway in a core network is important for the function of many radio coordination features.

In accordance with an aspect of the disclosed method, the step of query further comprises sending a query to the second radio base station for at least one characteristic for a path between the second radio base station and an IP end-point associated with the radio access transport network collected by the second radio base station.

In accordance with a further aspect of the disclosed method, the radio access network is an E-UTRAN, Evolved UMTS Terrestrial Radio Access Network, and the radio base station is an eNodeB, Evolved Node B, in the E-UTRAN.

In accordance with a yet further aspect of the disclosed method, the characteristics for a path are any of bandwidth, radio access transport network delay, congestion indication, jitter, buffer usage and sync accuracy.

The characteristics up to the S/PDN-GW is important to know, especially the available bandwidth from different radio base stations, by this knowledge the radio network can decide which radio base station an active user should be connected to for optimal end-user performance/experience.

The characteristics between radio base stations are important to be able to select an optimal radio coordination feature that depends on coordinating traffic between radio base stations. E.g. up-link joint reception requires low delay/jitter, high bandwidth and tight time/phase synchronization. ABS/RPSF requires tight time/phase synchronization, but very limited bandwidth and can tolerate large amount of delay/jitter.

In accordance with another aspect of the disclosed method, the step of query further comprises sending a query to at least one further node in the radio access transport network.

In accordance with an aspect of the disclosed method, the method comprising a further step, after the steps of receiving, of receiving at least one update of characteristics for a path between two IP end-points in the radio access transport network.

In accordance with another aspect of the disclosed method, the step of sending a query is performed by an I2RS-client, Interface to the Routing System, in the radio base station.

The present disclosure also relates to embodiments of a radio base station for collecting characteristics for a path between two IP end-point associated with a radio access transport network to which the radio base station is connected comprising a processor and a memory. The memory containing instructions executable by the processor whereby the radio base station is operative to receive an IP address of at least one IP end-point associated with the radio access transport network to which the radio base station is connected; sending a query to a node in the radio access transport network for at least one characteristic for a path between two IP end-points; and to receive the at least one characteristics for the path.

The present disclosure also relates to embodiments of a node for collecting characteristics for a path between two IP end-points associated with a radio access transport network to which a radio base station is connected comprising a processor and a memory. The memory containing instructions executable by the processor whereby the node is operative to receive a query from a radio base station connected to the radio access transport network (20), for at least one characteristic for a path between two IP end-points associated with the radio access transport network to which the first radio base station is connected, and to determine the at least one characteristics for the path between the two IP end-points. Further also transmit the at least one characteristics for the path to the radio base station.

The present disclosure also presents a computer program, comprising computer readable code which, when run in a radio base station causes radio base station to perform the disclosed method.

The radio base station, the node and computer program each display advantages corresponding to the advantages already described in relation to the method performed in the radio base station.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Aspects of the present disclosure will be described more fully hereinafter with reference to the accompanying drawings. The methods and wireless device disclosed herein can, however, be realized in many different forms and should not be construed as being limited to the aspects set forth herein. Like numbers in the drawings refer to like elements throughout.

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

The terminology used herein is for the purpose of describing particular aspects of the disclosure only, and is not intended to limit the disclosure to any particular embodiment. As used herein, the singular forms "a", "an" and "the" are intended to include the plural forms as well, unless the context clearly indicates otherwise.

It is an object of the present disclosure to provide embodiments solving the problem of providing network characteristics information to enable selection of optimal radio coordination features.

According to an aspect of the present disclosure, an interface is created between a radio base station and a node associated with a radio access transport network. According to an aspect of the present disclosure, the interface makes it possible to request information from the radio access transport network and forward the information in suitable format to the radio base station to assist in the decision of radio coordination features e.g. to assess if the network conditions meet the requirements associated with the radio coordination features.

A concept involves receiving IP addresses of specific IP end-points associated with a radio access transport network to which a radio base station is connected and to send a query to a node in the radio access transport network for at least one characteristic for a path between two IP end-points.

Figure 1:
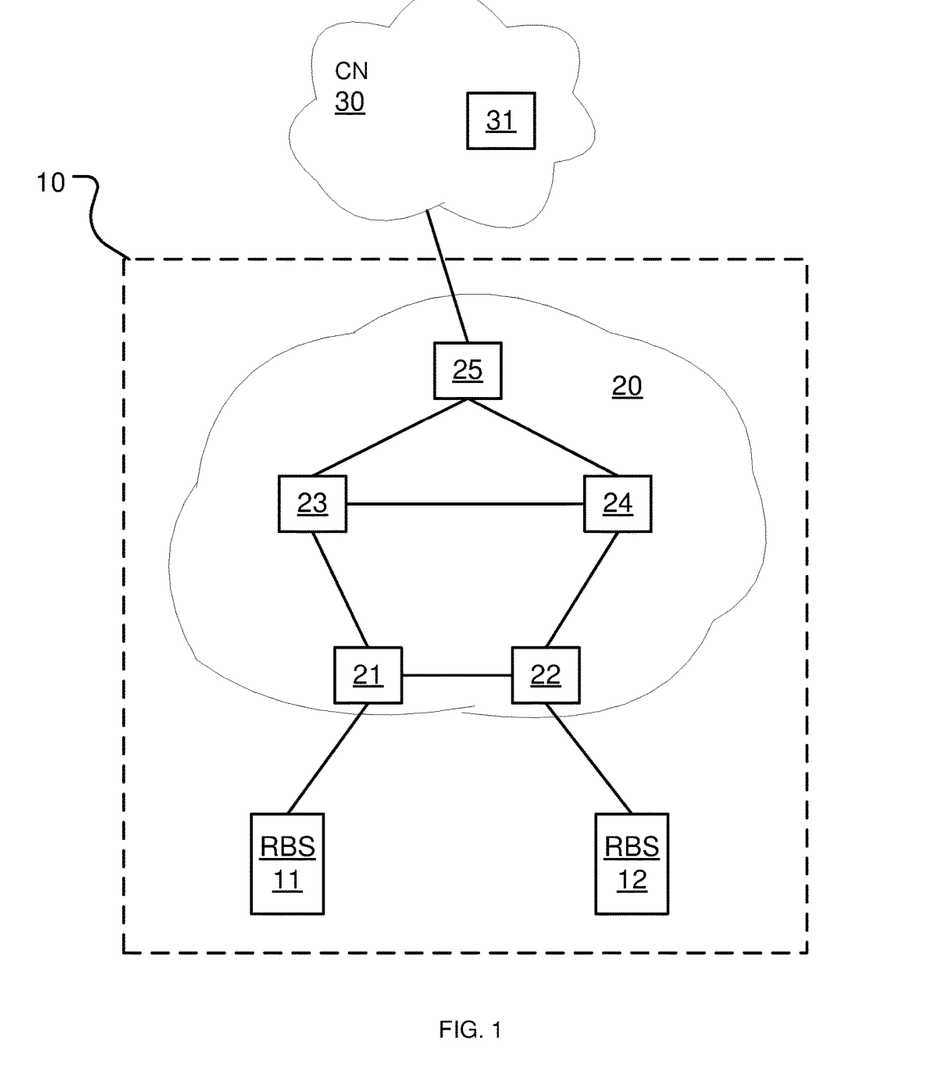
FIG. 1 schematically illustrates a cellular communication network in which exemplary embodiments of the present disclosure can be implemented.

FIG. 1 schematically illustrates a cellular communication network 1 in which aspects of the present disclosure can be implemented. The cellular communication network 1 comprises a radio access network 10. The radio access network 10 comprises a radio access transport network 20. The radio access transport network 20 handles data traffic between radio base stations 11, 12 and between radio base stations 11, 12 and a core network 30. An example of a radio access network 10 is UTRAN, Universal Terrestrial Radio Access Network. The UTRAN is the radio access network 10 in UMTS, Universal Mobile Telecommunications System. Another radio access network 10 is E-UTRAN. The E-UTRAN is the radio access network 10 in an LTE system. In the radio access transport network 20 there are nodes 21, 22, 23, 24 and 25.

Figure 2:
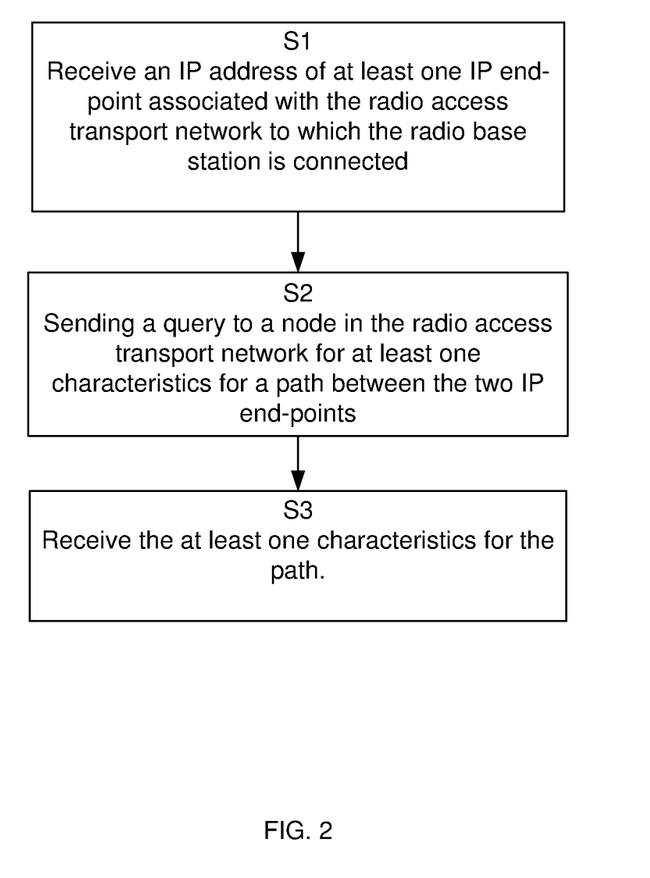
FIG. 2 is a flow chart illustrating the proposed methods performed in a radio base station.

FIG. 2 is a flowchart schematically illustrating embodiments of method steps performed in a in the radio base station 11, 12 in the radio access network 10, of collecting characteristics for a path between two IP end-point 11, 12, 31 associated with the radio access transport network 20 to which the radio base station 11, 12 is connected. In a first step S1 IP addresses are received for one or more IP end-points 11, 12, 31 associated with the radio access transport network 20 to which the radio base station 11, 12 is connected.

According to an aspect of the present disclosure, the IP end-points are for instance a radio base station 10, 11, a PDN-Gateway 31 or a S-PDN-Gateway 31 in the core network 30.

In a next step S2, a node 21, 22, 23, 24, 25 in the radio access transport network 20 is queried for at least one characteristic for a path between two IP end-points 11, 12, 31. According to one exemplary embodiment of the present disclosure, the node 21, 22 that the radio base station 11, 12 is connected to is queried. The present disclosure is however not limited to only send a query to the node 21, 22 that the radio base station 11, 12 is connected to. In exemplary embodiments of the present disclosure, a query is sent to another node 23, 24, 25 in the radio access transport network 20 requesting at least one characteristic for a path between two IP end-points 11, 12, 31.

The at least one characteristic for the path between the two IP end-points 11, 12, 31 relates, in one aspect of the present disclosure, to characteristics for the entire path between the two IP end-points 11, 12, 31. In other exemplary embodiments of the present disclosure, the at least one characteristic for the path between the two IP end-points 11, 12, 31, relates to characteristics for one link or for several links (not shown) in the path between the two IP end-points 11, 12, 31. One link in the path between the radio base station 11 and the radio base station 12 is according to one aspect of the present disclosure, a link between the node 21 and the node 22 in the radio access transport network 20. Characteristics for the link between the node 21 and the node 22 in the radio access transport network 20 comprise, according to aspects of the present disclosure, bandwidth, radio access transport network delay, a congestion indication, jitter, buffer usage or synchronization accuracy.

In a further step S3, the at least one characteristics for the path received in the radio base station 11, 12.

According to an aspect of the present disclosure, one of the radio base stations 11, 12 is a master radio base station 11, 12 and the other radio base station 11, 12 is a slave radio base station 11, 12. In exemplary embodiments of the present disclosure it is the master radio base station 11, 12 that decides which coordination features to use.

According to one aspect of the disclosure, it is a responsibility of the master radio base station 11, 12 to request at least one characteristic for paths for both the master and slave radio base station 10, 11. Based on the obtained characteristics information, the master radio base station 10, 11 decides which coordination feature to use. If the network characteristics do not meet specific requirements, the master radio base station 10, 11 takes a decision not to use certain radio coordination features or any of the radio coordination features.

When the radio base station 11, 12 is the master radio base station 11, 12 for a UE, User Equipment, (not shown) the radio base station 11, 12 also receives information from the UE that it can hear the slave radio base station 11, 12. Based on this information the master radio base station 11, 12 takes a radio coordination feature decision that it is beneficial for the UE to run one or more radio coordination features. But to be able to use and select a radio coordination feature, the master radio base station 11, 12 must also know the characteristics of the radio access transport network 10 for the path between radio base station 11 and 12.

The master radio base station 11, 12 receives an IP address of at least one IP end-point 11, 12, 31 associated with the radio access transport network 20 to which the radio base 11, 12 station is connected. According to one aspect of the present disclosure the radio base station 11, 12 receives an IP address of at least one IP end-point 11, 12, 31 associated with the radio access transport network 20 to which the radio base 11, 12 station is connected using ANR, Automatic Neighbor Relation.

The radio base station 11, 12 then sends a query to a node 21, 22, 23, 24, 25 in the radio access transport network 20 for at least one characteristic for a path between two IP end-points 11, 12, 31. According to one aspect of the present disclosure, the radio base station 11, 12 sends a query for characteristic for a path between the master radio base station 11, 12 and slave radio base station 11, 12, as well as for a path between the master radio base station 11, 12 and PDN-GW 31 and a path between the slave radio base station 11, 12 and PDN-GW 31.

According to an aspect of the present disclosure both the master radio base station 11, 12 and the slave radio base station 11, 12 send queries to at least one node 21, 22, 23, 24, 25 in the radio access transport network 20 for at least one characteristic for a path between two IP end-points 11, 12, 31. In exemplary embodiments of the present disclosure, the master radio base station 11, 12 sends a query to at least one node 21, 22, 23, 24, 25 in the radio access transport network 20 for at least one characteristics for a path between the master radio base station 11, 12 and the slave radio base station 11, 12 as well as for a path between the master radio base station 11, 12 and the PDN-GW-IP 31.

The master radio base station 11 then sends a query to the second radio base station 11, 12 for at least one characteristics for a path between the second radio base station 11, 12 and an IP end-point 11, 12, 31 associated with the radio access transport network 20; the characteristics collected by the second radio base station 11, 12. The master radio base station 11 decides which radio coordination feature to use. When the radio access transport network do not meet the specific requirements, the master radio base station 11, 12 takes a decision not to use one or more radio coordination features or any of the radio coordination features.

According to one aspect of the present disclosure, for the radio coordination feature to work, it is mainly the radio base station 11, 12 to radio base station 11, 12 transport path characteristics that is of importance. According to another aspect of the present disclosure some radio coordination features requires high amount of bandwidth as well as very low delay in the radio access transport network 20. Different radio coordination features also require different levels of synchronization; some work with frequency synchronization and others require time/phase synchronization between the radio base stations 11, 12 to work. There are also different levels of time/phase synchronization required for different radio coordination features. According to one aspect of the present disclosure these are the most important characteristics to make the radio coordination work.

In accordance with a further aspect of the present disclosure, if the capacity from the master radio base station 11, 12 to the PDN-GW 31 is limited, the advantage of using a radio coordination feature for the end-user might also be limited, If the capacity from the slave radio base station 11, 12 to the PDN-GW 31 is better, the master relationship can change to the other radio base station 11, 12 instead, but only if the master radio base station 11, 12 has the picture of characteristics for relevant IP end-points from the slave radio base station 11, 12 point of view as well.

According to a yet further aspect of the present disclosure, when a radio coordination feature has been activated between two radio base stations 11, 12, the master radio base station 11, 12 also receives at least one update of characteristics for a path between two IP end-points 11, 12, 31 in the radio access transport network. An advantage with this aspect is that the radio base station 11, 12 is able to adapt the radio coordination based on changes in the characteristics for a path between two IP end-points 11, 12, 31 associated with the radio access transport network 20.

Turning back to FIG. 2, in the step S2 of sending a query, the IP end-points 11, 12, 31 are the first radio base station 11, 12 and the second radio base station 11, 12 according to an aspect of the present disclosure. In yet another aspect of the present disclosure, in the step S2 of sending a query, the radio base station 11, 12 and the PDN-Gateway or a S/PDN-Gateway 31 in the core network 30 to which the radio access network (10) is connected are IP end-points 11, 12, 31. As mention above, according to an aspect of the present disclosure when the radio base station 11, 12 is the master radio base station 11, 12, the master radio base station also sends a query to the slave radio base station to retrieve the slave radio base station's 11, 12 perspective on the characteristics for a path between the two IP end-points 11, 12, 31. In exemplary embodiments of this aspect the step S2 of sending a query further comprises sending a query to the second radio base station 11, 12 for at least one characteristic for a path between the second radio base station 11, 12 and an IP end-point 11, 12, 31 associated with the radio access transport network 20 collected by the second radio base station 11, 12.

In exemplary embodiments of the present disclosure, characteristics for a path comprise bandwidth, radio access transport network delay, congestion indication, jitter, buffer usage and sync accuracy.

According to a further aspect of the present disclosure the step S2 of sending a query further comprises sending a query to at least one further node 23, 24, 25 in the radio access transport network 20 for at least one characteristic for a path between two IP end-points 11, 12, 31. In these exemplary embodiments the radio base station 11, 12 first sends a query to the first node 21, 22, 23, 24, 25 in the radio access transport network 20 for at least one characteristics for a path between two IP end-points 11, 12. In order to get more characteristics information the radio base station 11, 12 then sends a query to at least one further node 23, 24, 25 in the radio access transport network 20 for further characteristic information.

According to an aspect of the present disclosure the step S2 of sending a query is performed by an I2RS-client, Interface to the Routing System, in the radio base station.

Figure 2A:
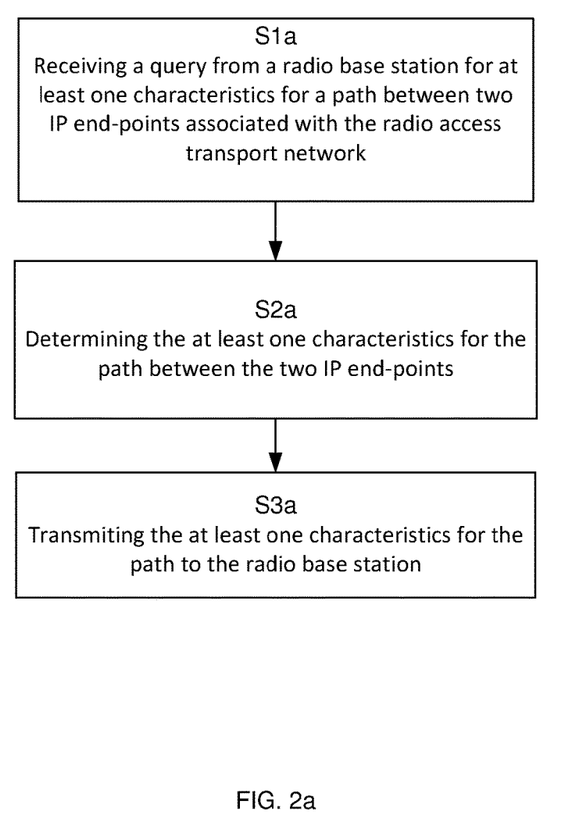
FIG. 2a is a flow chart illustrating the proposed methods performed in a node.

FIG. 2a is a flowchart schematically illustrating embodiments of method steps performed in a node 21, 22, 23, 24, 25 in the radio access transport network 10, of collecting characteristics for a path between two IP end-point 11, 12, 31 associated with the radio access transport network 20 to which the radio base station 11, 12 is connected. In a first step S1a a query from a radio base station 11, 12 connected to the radio access transport network 20 is received, for at least one characteristics for a path between two IP end-points 11, 12, 31 associated with the radio access transport network 20 to which the first radio base 11, 12 station is connected. According to an aspect of the present disclosure, the IP end-points are for instance a radio base station 10, 11, a PDN-Gateway 31 or a S-PDN-Gateway 31 in the core network 30.

In a next step S2a, the at least one characteristics for the path between the two IP end-points 11, 12, 31 is determined. In a further step S3a, the at least one characteristics for the path to the radio base station 11, 12 is transmitted.

According to an aspect of the present disclosure the step S1a, S2a, S3a are performed by an I2RS-agent, Interface to the Routing System, in the node 21, 22, 23, 24, 25.

Figure 3:
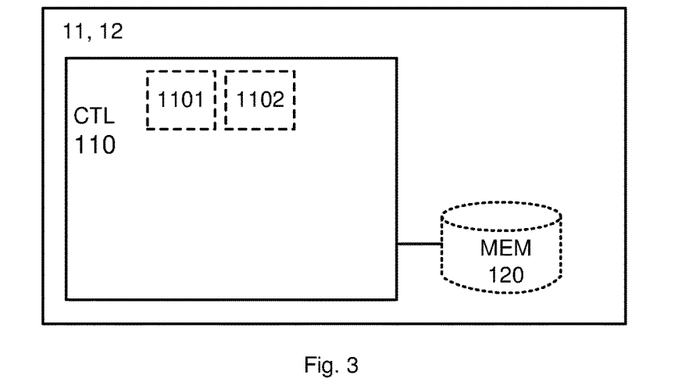
FIG. 3 is a schematic diagram illustrating radio base station according to an exemplary embodiment of the present disclosure.

Turning now to FIG. 3, a schematic diagram is disclosed illustrating an exemplary embodiment of a radio base station 11, 12 for collecting characteristics for a path between two IP end-point 11, 12, 31 associated with a radio access transport network 20 to which the radio base station 11, 12 is connected. The radio base station 11, 12 comprises a processor 110 and a memory 120, the memory 212 containing instructions executable by the processor 110. The processor 110 is a Central Processing Unit, CPU, microcontroller, Digital Signal Processor, DSP, or any other suitable type of processor capable of executing computer program code. The memory 212 is a Random Access Memory, RAM, a Read Only Memory, ROM, or a persistent storage, e.g. a single or combination of magnetic memory, optical memory, or solid state memory or even remotely mounted memory.

According to one aspect, the disclosure further relates to the above mentioned computer program, comprising computer readable code which, when run on the radio base station 11, 12 causes the radio base station 11, 12 to perform any of the aspects of the method described above.

When the above-mentioned computer program code is run in the processor 110 of the radio base station 11, 12 it causes the radio base station to receive an IP address of at least one IP end-point 11, 12, 31 associated with the radio access transport network 20 to which the radio base 11, 12 station is connected. The computer program codes further causes the radio base station 11, 12 to send a query to a node 21, 22, 23, 24, 25 in the radio access transport network 20 for at least one characteristics for a path between two IP end-points 11, 12, 31 and to receive the at least one characteristics for the path.

According to one aspect, the disclosure further relates to the above mentioned computer program, comprising computer readable code which, when run on the radio base station 11, 12, causes the radio base station 11, 12 to perform any of the aspects of the method described above.

According to one aspect of the disclosure the processor 110 comprises one or several of:

- a receiver module 1101 adapted to receive an IP address of at least one IP end-point 11, 12, 31 associated with the radio access transport network 20 to which the radio base 11, 12 station is connected;
- a query sending module 1102 adapted to send a query to a node 21, 22, 23, 24, 25 in the radio access transport network 20 for at least one characteristics for a path between two IP end-points 11, 12, 31, wherein the two IP end-points comprise the at least one IP end-point 11, 12, 31; and
- the receiver module 1101 being further configured to receive the at least one characteristics for the path.

According to one aspect the radio base station 11, 12 is further adapted to send a query to the node 21, 22, 23, 24, 25 in the radio access transport network 20 for at least one characteristics for a path between two IP end-points 11, 12, 31, wherein the IP end-points 21, 22, 31 are the first radio base station 11, 12 and the second radio base station 11, 12. According to one aspect the radio base station 11, 12 comprises a query sending module 1102 configured for this purpose.

According to a further aspect the radio base station 11, 12 is further adapted to send a query to the node 21, 22, 23, 24, 25 in the radio access transport network 20 for at least one characteristics for a path between two IP end-points 11, 12, 31, wherein, a first radio base station 11, 12 and a PDN-Gateway or a S/PDN-Gateway 31 in a core network 30 to which the radio access network 10 is connected are the IP end-points 11, 12, 31. According to one aspect the radio base station 11, 12 comprises a query sending module 1102 configured for this purpose.

According to a further aspect the radio base station 11, 12 is further adapted to send a query the node 21, 22, 23, 24, 25 in the radio access transport network 20 for at least one characteristics for a path between two IP end-points 11, 12, 31, wherein, the second radio base station 11, 12 and a PDN-Gateway or a S/PDN-Gateway 31 in a core network 30 to which the radio access network 10 is connected are the IP end-points 11, 12, 31. According to one aspect the radio base station 11, 12 comprises a query sending module 1102 configured for this purpose.

According to a further aspect the radio base station 11, 12 is further adapted to send a query the second radio base station 11, 12 for at least one characteristics for a path between the second radio base station 11, 12 and an IP end-point 11, 12, 31 associated with the radio access transport network 20 collected by the second radio base station 11, 12. According to one aspect the radio base station 11, 12 comprises a query sending module 1102 configured for this purpose.

According to a further aspect the radio base station 11, 12 is an eNodeB, Evolved Node B, in the E-UTRAN and the radio access network 10 is an E-UTRAN, Evolved UMTS Terrestrial Radio Access Network.

According to a further aspect the radio base station 11, 12 the characteristics for a path are comprises bandwidth, radio access transport network delay, congestion indication, jitter, buffer usage and synchronization accuracy.

In accordance with a further aspect the radio base station 11, 12 is further operative to send a query to at least one further node 23, 24, 25 in the radio access transport network 20. According to one aspect the radio base station 11, 12 comprises a query sending module 1102 configured for this purpose.

According to a further aspect, the radio base station 11, 12 is further adapted to receive at least one update of characteristics for a path between two IP end-points 11, 12, 31 in the radio access transport network. According to one aspect, the radio base station 11, 12 comprises a query module 1102 configured for this purpose.

According to a further aspect, the radio base station 11, 12 is further operative to query with an I2RS-client, Interface to the Routing System, in the radio base station 10, 11. According to one aspect, the radio base station 11, 12 comprises a query sending module 1102 configured for this purpose.

The receiver 1101 and the query sending module 1102 are implemented in hardware or in software or in a combination thereof. The modules 1101 and 1102 are according to one aspect implemented as a computer program stored in the memory 212 which run on the processing circuitry 120. The radio base station 11, 12 is further configured to implement all the aspects of the disclosure as described in relation to the methods above.

Figure 4:
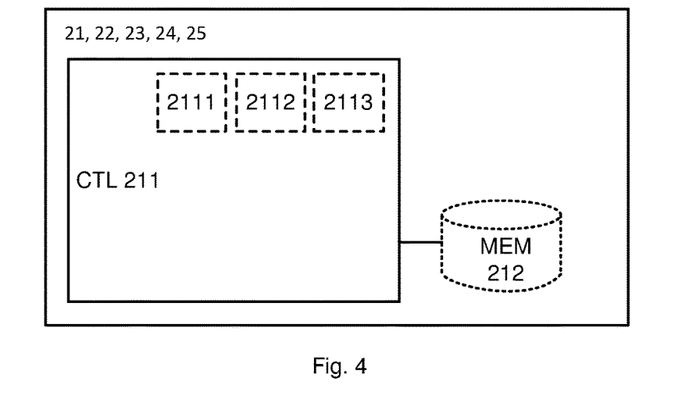
FIG. 4 is a schematic diagram illustrating radio base station according to an exemplary embodiment of the present disclosure.

Turning now to FIG. 4, a schematic diagram illustrating a node 21, 22, 23, 24, 25 of an exemplary embodiment for collecting characteristics for a path between two IP end-point 11, 12, 31 associated with a radio access transport network 20 to which the radio base station 11, 12 is connected comprising a processor 211 and a memory 212, the memory 212 containing instructions executable by the processor 211 whereby the node is operative to: receive a query from a radio base station 11, 12 connected to the radio access transport network 20, for at least one characteristics for a path between two IP end-points 11, 12, 31 associated with the radio access transport network 20 to which the first radio base 11, 12 station is connected; determine the at least one characteristics for the path between the two IP end-points 11, 12, 31 and transmit the at least one characteristics for the path to the radio base station 11, 12. The processor 211 is a Central Processing Unit, CPU, microcontroller, Digital Signal Processor, DSP, or any other suitable type of processor capable of executing computer program code. The memory 212 is a Random Access Memory, RAM, a Read Only Memory, ROM, or a persistent storage, e.g. a single or combination of magnetic memory, optical memory, or solid state memory or even remotely mounted memory.

According to one aspect, the disclosure further relates to the above mentioned computer program, comprising computer readable code which, when run on the node 21, 22, 23, 24, 25 causes the node 21, 22, 23, 24, 25 to perform any of the aspects of the method described above.

When the above-mentioned computer program code is run in the processor 211 of the node 21, 22, 23, 24, 25 it causes the node 21, 22, 23, 24, 25 to receive a query from the radio base station 11, 12 connected to the radio access transport network 20, for at least one characteristics for a path between two IP end-points 11, 12, 31 associated with the radio access transport network 20 to which the first radio base 11, 12 station is connected; determine the at least one characteristics for the path between the two IP end-points 11, 12, 31; and transmit the at least one characteristics for the path to the radio base station 11, 12.

According to one aspect, the disclosure further relates to the above mentioned computer program, comprising computer readable code which, when run on the node 21, 22, 23, 24, 25 causes the node 21, 22, 23, 24, 25 to perform any of the aspects of the method described above.

According to one aspect of the disclosure the processor 211 comprises one or several of:
- a receiver module 2111 adapted to receive a query from a radio base station 11, 12 connected to the radio access transport network 20, for at least one characteristics for a path between two IP end-points 11, 12, 31 associated with the radio access transport network 20 to which the first radio base 11, 12 station is connected.
- a determining module 2112 adapted to determine the at least one characteristics for the path between the two IP end-points 11, 12, 31, wherein the two IP end-points (11, 12, 31) comprise the at least one of the IP end-points (11, 12, 31);
- a transmitter module 2113 being further configured to transmit the at least one characteristics for the path to the radio base station 11, 12

According to one aspect, the node 21, 22, 23, 24, 25 is further adapted to receive a query for and determine at least one characteristics for a path between two IP end-points 11, 12, 31, wherein the IP end-points 21, 22, 31 are the first radio base station 11, 12 and a second radio base station 11, 12. According to one aspect the node 21, 22, 23, 24, 25 comprises a receiver module 2112, a determining module 2112 and a transmitter module 2113 configured for this purpose.

According to one aspect, the node 21, 22, 23, 24, 25 is further adapted to receive a query for and determine at least one characteristic for a path between two IP end-points 11, 12, 31, by running an I2RS-agent, Interface to the Routing System, agent. According to one aspect the node 21, 22, 23, 24, 25 comprises a receiver module 2112, a determining module 2112 and a transmitter module 2113 configured for this purpose.

The receiver module 2111, the determining module 2112 and the transmitter module 2113 are implemented in hardware or in software or in a combination thereof. The modules 2111, 2112 and 2113 are according to one aspect implemented as a computer program stored in the memory 212 which run on the processing circuitry 211. The node 21, 22, 23, 24, 25 is further configured to implement all the aspects of the disclosure as described in relation to the methods above.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method, performed in a first radio base station in a radio access network, of collecting characteristics for a path between two IP end-points associated with a radio access transport network, the method comprising:
   receiving an IP address of at least one IP end-point associated with the radio access transport network to which the first radio base station is connected;
   sending a query to a node in the radio access transport network for at least one characteristic for a path between the two IP end-points, wherein the two IP end-points comprise the at least one IP end-point, and the node routes traffic between the two IP end-points;
   receiving the at least one characteristic for the path between the two IP end-points;
   comparing the at least one characteristic for a path between the two IP end points with at least one characteristic for a path between a second radio base station and an IP end point that is one of the two IP end points; and
   determining, based on the comparison, which of the first radio base station and the second radio base station should serve as a master base station that decides whether radio coordination features should be used.

2. The method of claim 1, wherein the two IP end-points are the first radio base station and the second radio base station.

3. The method of claim 1, wherein the two IP end-points are the first radio base station and a PDN-Gateway or a S/PDN-Gateway in a core network to which the radio access network is connected.

4. The method of claim 1, wherein the two IP end-points are the second radio base station and a PDN-Gateway or a S/PDN-Gateway in a core network to which the radio access network is connected are IP end-points.

5. The method of claim 1, wherein the method further comprises sending a second query to the second radio base station for the at least one characteristic, collected by the second radio base station, for the path between the second radio base station and the IP end-point that is one of the two IP end points.

6. The method of claim 1, wherein the radio access network is an Evolved UMTS Terrestrial Radio Access Network (E-UTRAN) and the first radio base station is an Evolved Node B (eNodeB) in the E-UTRAN.

7. The method of claim 1, wherein the characteristics are any of: bandwidth, radio access transport network delay, congestion indication, jitter, buffer usage, and sync accuracy.

8. The method of claim 7, wherein the sending a query for at least one characteristic comprises sending a query for multiple ones of bandwidth, radio access transport network delay, congestion indication, jitter, buffer, usage, and sync accuracy.

9. The method of claim 1, wherein the sending a query comprises querying at least one further node in the radio access transport network.

10. The method of claim 1, further comprising, after the receiving the at least one characteristic for the path between the two IP end-points, receiving at least one update of the at least one characteristic for the path between the two IP end-points.

11. The method of claim 1, wherein the sending a query is performed by an Interface to a Routing System client in the first radio base station.

12. The method of claim 1, wherein the at least one characteristic of a path between the two IP end-points comprises at least one characteristic of a single link in the radio access transport network.

13. The method of claim 1, wherein the at least one characteristic of a path between the two IP end-points comprises at least one characteristic of a path segment of the entire path between the two IP end-points, wherein the path segment comprises several links in the radio access transport network.

14. The method of claim 1, wherein the sending a query comprises querying multiple nodes in the radio access transport network for at least one characteristic for each of multiple different paths between the two IP end-points.

15. The method of claim 1, wherein the method further comprises based on the received at least one characteristic for the path between the two IP end-points, deciding which category of radio coordination features to use, wherein the radio coordination features are categorized into different groups based on how tight of a coordination is required.

16. A first radio base station configured to collect characteristics for a path between two IP end-points associated with a radio access transport network, the first radio base station comprising
 a processor; and
 memory containing instructions executable by the processor whereby the first radio base station is operative to:
  receive an IP address of at least one IP end-point associated with the radio access transport network to which the first radio base station is connected;
  send a query to a node in the radio access transport network for at least one characteristic for a path between the two IP end-points, wherein the two IP end-points comprise the at least one IP end-point, and the node routes traffic between the two IP end-points;
  receive the at least one characteristic for the path between the two IP end-points;
  compare the at least one characteristic for a path between the two IP end points with at least one characteristic for a path between a second radio base station and an IP end point that is one of the two IP end points; and
  determine, based on the comparison, which of the first radio base station and the second radio base station should serve as a master base station that decides whether radio coordination features should be used.

17. The first radio base station of claim 16, wherein the two IP end-points are the first radio base station and the second radio base station.

18. The first radio base station of claim 16, wherein the two IP end-points are the first radio base station and a PDN-Gateway or a S/PDN-Gateway in a core network to which the radio access network is connected.

19. The first radio base station of claim 16, wherein the two IP end-points are the second radio base station and a PDN-Gateway or a S/PDN-Gateway in a core network to which the radio access network is connected.

20. The first radio base station of claim 16, wherein the instructions are such that the first radio base station is operative to send a query to the second radio base station for the at least one characteristic, collected by the second radio base station, for the path between the second radio base station and the IP end-point of the two IP end points.

21. The first radio base station of claim 16, wherein the radio access network is an Evolved UMTS Terrestrial Radio Access Network (E-UTRAN) and the first radio base station is an Evolved Node B (eNodeB) in the E-UTRAN.

22. The first radio base station of claim 16, wherein the characteristics for a path are any of: bandwidth, radio access transport network delay, congestion indication, jitter, buffer usage, and sync accuracy.

23. The first radio base station of claim 16, wherein the instructions are such that the first radio base station is further operative to send a query to at least one further node in the radio access transport network.

24. The first radio base station of claim 16, wherein the instructions are such that the first radio base station is further operative to receive at least one update of the at least one characteristic for the path between the two IP end-points.

25. The first radio base station of claim 16, wherein the instructions are such that the first radio base station is further operative to send the query with an Interface to a Routing System client in the first radio base station.

26. A computer program product stored in a non-transitory computer readable medium for collecting characteristics for a path between two IP end-points associated with a radio access transport network, the computer program product comprising software instructions which, when run on a processor of a first radio base station, causes the first radio base station to:
 receive an IP address of at least one IP end-point associated with the radio access transport network to which the first radio base station is connected;

send a query to a node in the radio access transport network for at least one characteristic for a path between the two IP end-points, wherein the two IP end-points comprise the at least one IP end-point and the node routes traffic between the two IP end-points;

receive the at least one characteristic for the path between the two IP end-points;

compare the at least one characteristic for a path between the two IP end points with at least one characteristic for a path between a second radio base station and an IP end point that is one of the two IP end points; and determine, based on the comparison, which of the first radio base station and the second radio base station should serve as a master base station that decides whether radio coordination features should be used.

27. A method, performed in in node that routes traffic between two IP end-points, for collecting characteristics for a path between the two IP end-points associated with a radio access transport network, the method comprising:

receiving a query, from a first radio base station, for at least one characteristic for a path between the two IP end-points associated with the radio access transport network to which the first radio base station is connected;

determining the at least one characteristic for the path between the two IP end-points; and transmitting the at least one characteristic for the path to the first radio base station, wherein the first radio base station compares the at least one characteristic for a path with at least one characteristic for a path between a second radio base station and an IP end point that is one of the two IP end points; and determines, based on the comparison, which of the first radio base station and the second base station should serve as a master base station that decides whether radio coordination features should be used.

28. A node, that routes traffic between two IP end-points, configured to collect characteristics for a path between two IP end-points associated with a radio access transport network, the node comprising:

a processor;

memory containing instructions executable by the processor whereby the node is operative to:

receive a query, from a first radio base station, for at least one characteristic for a path between the two IP end-points associated with the radio access transport network to which the first radio base station is connected;

determine the at least one characteristic for the path between the two IP end-points; and transmit the at least one characteristic for the path to the first radio base station, wherein the first radio base station compares the at least one characteristic for a path with at least one characteristic for a path between a second radio base station and an IP end point that is one of the two IP end points; and determines, based on the comparison, which of the first radio base station and the second base station should serve as a master base station that decides whether radio coordination features should be used.

29. The node of claim 28, wherein the instructions are such that the node is further operative to run an Interface to a Routing System agent.

30. A computer program product stored in a non-transitory computer readable medium for collecting characteristics for a path between two IP end-points associated with a radio access transport network, the computer program product comprising software instructions which, when run on a processor of a node that routes traffic between the two IP end-points, causes the node to:

receive a query, from a first radio base station, for at least one characteristic for a path between the two IP end-points associated with the radio access transport network to which the first radio base station is connected;

determine the at least one characteristic for the path between the two IP end-points; and transmit the at least one characteristic for the path to the first radio base station, wherein the first radio base station compares the at least one characteristic for a path with at least one characteristic for a path between a second radio base station and an IP end point that is one of the two IP end points; and determines, based on the comparison, which of the first radio base station and the second base station should serve as a master base station that decides whether radio coordination features should be used.

* * * * *

UNITED STATES PATENT AND TRADEMARK OFFICE
CERTIFICATE OF CORRECTION

PATENT NO.       : 10,194,342 B2
APPLICATION NO.  : 15/109185
DATED            : January 29, 2019
INVENTOR(S)      : Welin et al.

It is certified that error appears in the above-identified patent and that said Letters Patent is hereby corrected as shown below:

In the Specification

In Column 3, Line 6, delete "a, the" and insert -- a query, the --, therefor.

In Column 5, Line 53, delete "in a in the" and insert -- in a --, therefor.

In Column 5, Line 63, delete "base station 10, 11," and insert -- base station 11, 12, --, therefor.

In Column 6, Line 39, delete "base station 10, 11." and insert -- base station 11, 12. --, therefor.

In Column 6, Lines 40-41, delete "base station 10, 11" and insert -- base station 11, 12 --, therefor.

In Column 6, Line 43, delete "base station 10, 11" and insert -- base station 11, 12. --, therefor.

In Column 6, Line 55, delete "radio access transport network 10" and insert -- radio access transport network 20 --, therefor.

In Column 8, Line 44, delete "radio access transport network 10," and insert -- radio access transport network 20, --, therefor.

In Column 8, Line 54, delete "base station 10, 11," and insert -- base station 11, 12, --, therefor.

In Column 9, Line 51, delete "end-points 21, 22, 31" and insert -- end-points 11, 12, 31 --, therefor.

In Column 10, Line 40, delete "base station 10, 11." and insert -- base station 11, 12. --, therefor.

In Column 11, Line 36, delete "connected." and insert -- connected; --, therefor.

In Column 11, Line 48, delete "end-points 21, 22, 31" and insert -- end-points 11, 12, 31 --, therefor.

Signed and Sealed this
Twenty-first Day of May, 2019

Andrei Iancu
*Director of the United States Patent and Trademark Office*

CERTIFICATE OF CORRECTION (continued)
U.S. Pat. No. 10,194,342 B2

In Column 11, Line 51, delete "receiver module 2112," and insert -- receiver module 2111, --, therefor.

In Column 11, Line 59, delete "receiver module 2112," and insert -- receiver module 2111, --, therefor.

In the Claims

In Column 15, Line 17, in Claim 27, delete "in in node" and insert -- in node --, therefor.